_(12)_ United States Patent
Pavlovic et al.

(10) Patent No.: US 6,889,924 B2
(45) Date of Patent: May 10, 2005

(54) FOOD PROCESSOR

(75) Inventors: Henrik Pavlovic, Ljubno Ob Savinji (SI); Jurij Pesec, Petrovce (SI); Darko Rudez, Bentjur (SI); Igor Zibret, Smartno Ob Paki (SI)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 0 days.

(21) Appl. No.: 10/260,327

(22) Filed: Sep. 30, 2002

(65) Prior Publication Data

US 2003/0066916 A1 Apr. 10, 2003

Related U.S. Application Data

(63) Continuation of application No. PCT/EP01/02083, filed on Feb. 23, 2001.

(30) Foreign Application Priority Data

Mar. 31, 2000 (DE) .......................................... 100 16 294

(51) Int. Cl.7 ............................................. A47J 43/046
(52) U.S. Cl. ...................... 241/37.5; 366/314; 366/341; 241/285.2
(58) Field of Search ...................... 241/37.5, 93, 285.2, 241/199.12; 366/247, 249, 314, 341

(56) References Cited

U.S. PATENT DOCUMENTS 4,113,188 A * 9/1978 Belinkoff .................... 241/37.5
4,390,133 A * 6/1983 Wanat .......................... 241/93
6,186,425 B1 * 2/2001 Celso De Almeida Mattos 241/37.5

FOREIGN PATENT DOCUMENTS

| CH | 379437 | 7/1964 |
| DE | 197 37 130 A1 | 3/1999 |
| FR | 2 641 590 | 7/1990 |
| NL | 7300339 | 7/1973 |

* cited by examiner

Primary Examiner—Mark Rosenbaum
(74) Attorney, Agent, or Firm—Laurence A. Greenberg; Werner H. Stemer; Ralph E. Locher

(57) ABSTRACT

A household appliance, in particular, a food processor, includes a drive unit installed in a housing, a container having a tool is placed on the housing at the point thereon provided with a output shaft. The tool is capable of being coupled to the output shaft when the container is placed in position. Placement of the container in the correct position is ensured by providing an element, fitting together with a counter-element provided on the container, in a region of the placement point on the housing. The elements engage one another when the container is placed on the housing.

21 Claims, 2 Drawing Sheets

FOOD PROCESSOR

CROSS-REFERENCE TO RELATED APPLICATION

This application is a continuation of copending International Application No. PCT/EP01/02083, filed Feb. 23, 2001, which designated the United States and was not published in English.

BACKGROUND OF THE INVENTION

Field of the Invention

The invention relates to a food processor having a drive unit installed in its housing to drive a output shaft that can be coupled to a tool that is disposed in a container such as a mixing jar, chopping jar, or the like, the container being capable of being placed on the housing at the point thereon that is provided with the output shaft and the tool being capable of being coupled to the output shaft when the container is placed in position.

In a commercially available food processor, a blender attachment or beating jar can be placed on the housing thereof, at a point provided with an output shaft. When the blender attachment or beating jar is placed in position, its tool (beater blade) is coupled to the output shaft. For such a purpose, the blender attachment or beating jar has to be attached with its base in a particular position at the placement point on the housing. Correct placement is frequently achieved only after a plurality of attempts, when the correct position is found by chance.

SUMMARY OF THE INVENTION

It is accordingly an object of the invention to provide a food processor that overcomes the hereinafore-mentioned disadvantages of the heretofore-known devices of this general type and that significantly improves placement of the container in the correct position on the housing.

With the foregoing and other objects in view, there is provided, in accordance with the invention, a food processor, including a housing having a shaft connection point, a container for receiving a tool, the container removably placed at the housing adjacent the shaft connection point, an output shaft connected to the housing at the shaft connection point, the output shaft to be coupled to the tool when the container is placed at the housing at a given position, a drive unit disposed in the housing and coupled to the output shaft for driving the output shaft, and both the container and the housing having at least one positioning element, the at least one positioning element on the container and the housing being aligned with one another and lying at least approximately opposite one another when the container is placed at the housing in the given position.

According to the invention, at least one positioning element is provided both on the housing and on the container. These positioning elements are capable of being aligned with one another and lie at least approximately opposite one another when the container is placed on the housing in the correct position. The positioning elements indicate to a person operating the food processor the positionally correct placement point of the container on the housing. As a result, the placement of the container in its correct position is achieved at the first attempt.

In accordance with another feature of the invention, the positionally correct placement point of the container on the housing is particularly simple to identify if the positioning elements are disposed on the visible sides of the housing and of the container.

In accordance with a further feature of the invention, a positioning element on the container is particularly apparent if provision is made for a handle element provided on the container to form the positioning element.

In accordance with an added feature of the invention, a direct and, hence, unobstructed positionally correct placement of the container on the housing is achieved in a particularly simple manner, in a food processor having a container retained on its housing by a bayonet connection, if provision is made for the positioning elements to be in the form of plug-in elements that can be plugged one into the other in the placement position of the container on the housing.

In accordance with an additional feature of the invention, in a food processor in which the container is retained on the housing by a bayonet connection, a suitable construction of the elements that fit together is achieved by providing a lug-shaped projection and a corresponding receiving slot respectively disposed on the housing and on the container or vice-versa, the receiving slot extending over an arc length corresponding to the angle of twist of the bayonet connection.

In accordance with yet another feature of the invention, the container is one of a mixing jar, a chopping jar, and a jar for mini-choppers.

In accordance with yet a further feature of the invention, the container has an outside and a first marking on the outside, the housing has an outside and a second marking on the outside, and the first and second markings are visible from outside the container and the housing.

With the objects of the invention in view, there is also provided a food processor, including a housing having a shaft connection point, a food processing tool, a container receiving the tool, the container removably placed at the housing adjacent the shaft connection point, an output shaft connected to the housing at the shaft connection point, the output shaft coupled to the tool when the container is placed at the housing at a given position, a drive unit disposed in the housing and coupled to the output shaft for driving the output shaft, and both the container and the housing having at least one positioning element, the at least one positioning element on the container and the housing being aligned with one another and lying at least approximately opposite one another when the container is placed at the housing in the given position.

With the objects of the invention in view, there is also provided a food processor, including a housing having a first part of a bayonet connection and a first part of a plug-in element, a container having a second part of the bayonet connection and a second part of the plug-in element, the container retained on the housing in a given position by the first and second parts of the bayonet connection, and the first and second parts of the plug-in element inserted into one another when the container is placed at the housing in the given position.

With the objects of the invention in view, there is also provided a food processor, including a housing, a bayonet connection, a container retained on the housing by the bayonet connection, and the housing and the container having plug-in positioning elements inserted into one another in a position in which the container is placed at the housing.

Other features that are considered as characteristic for the invention are set forth in the appended claims.

Although the invention is illustrated and described herein as embodied in a food processor, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
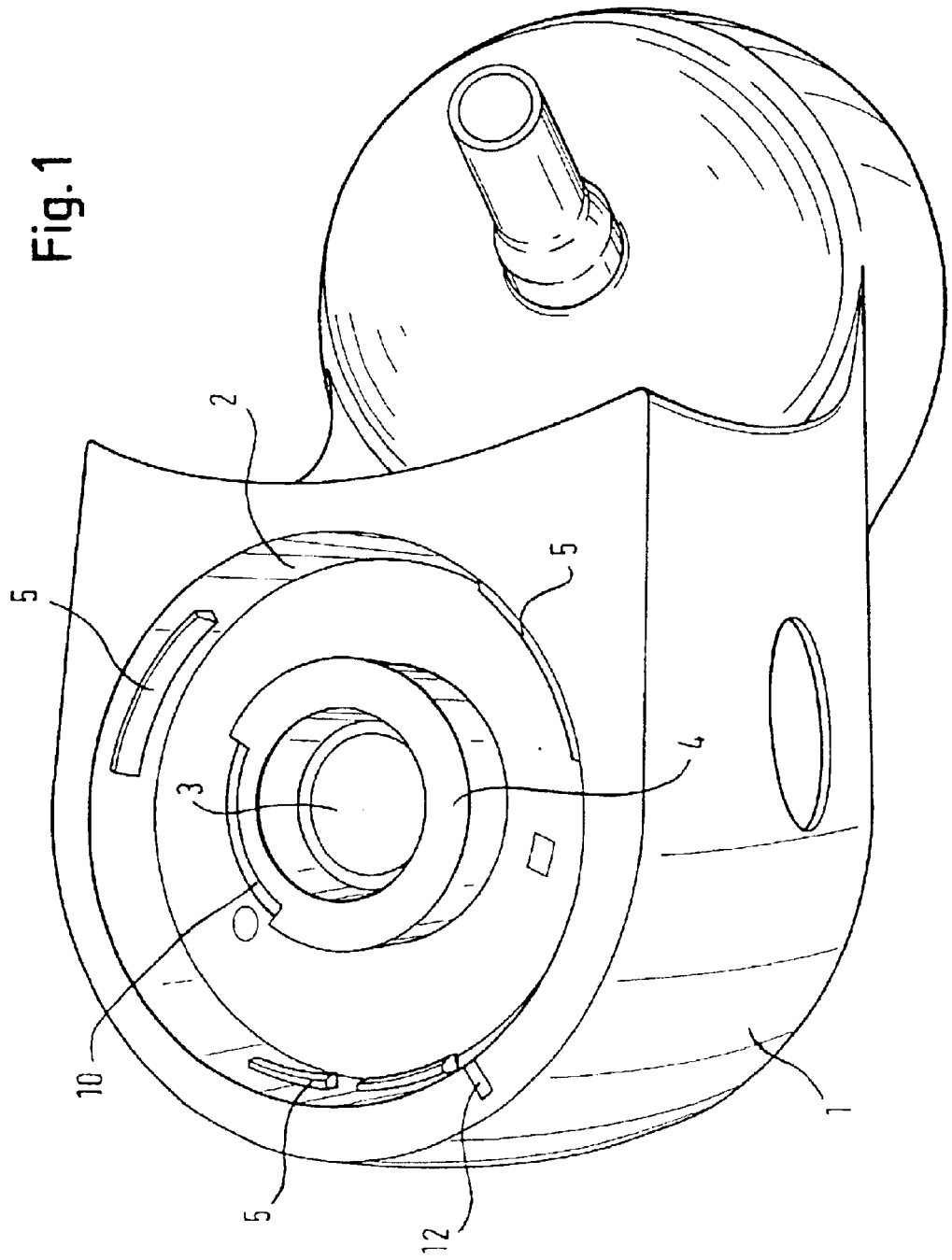
FIG. 1 is a perspective view of a housing of a food processor according to the invention.
Figure 2:
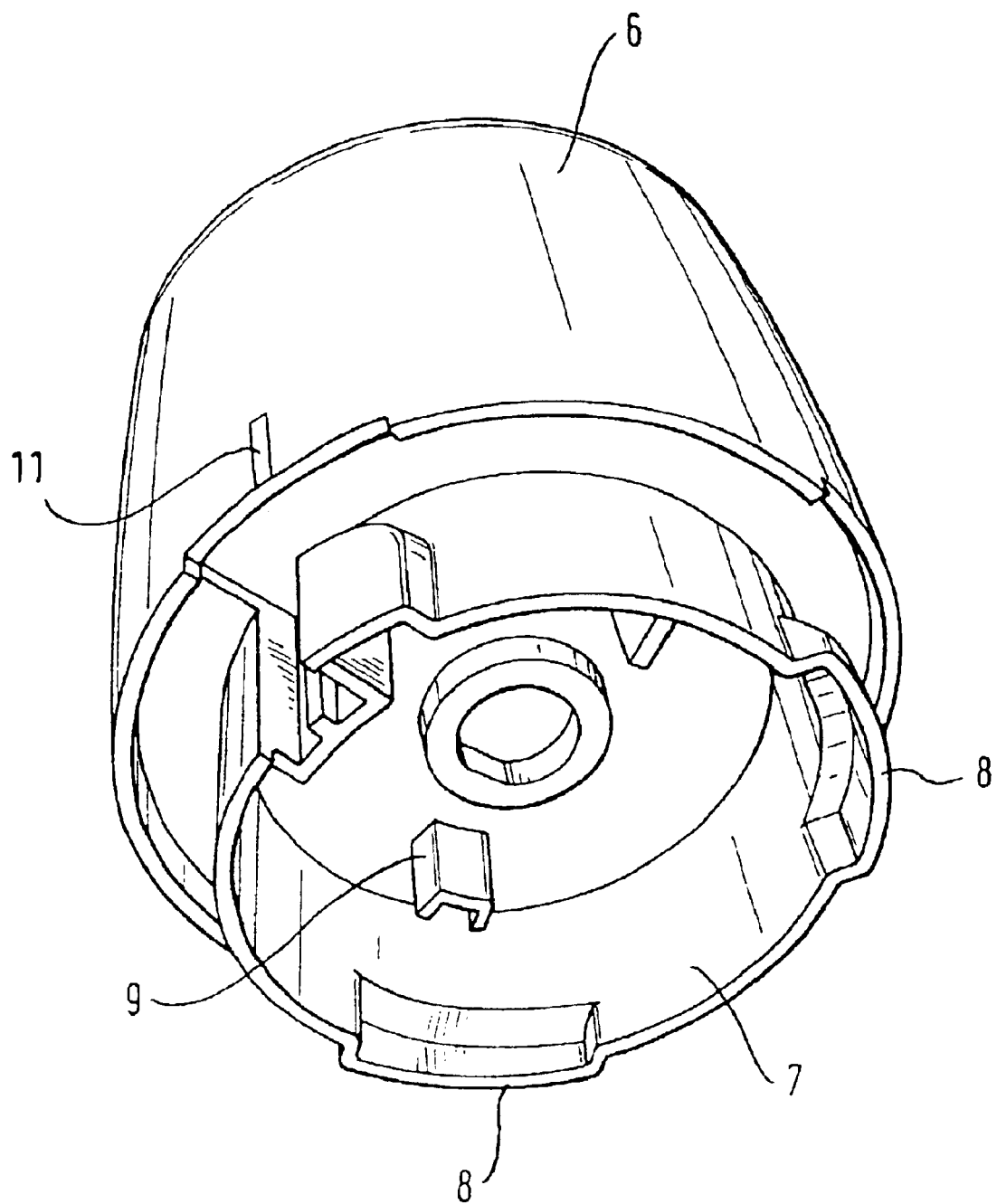
FIG. 2 is a perspective view from below of a beating jar that can be coupled to an output shaft of the food processor according to the invention.

Referring now to the figures of the drawings in detail and first, particularly to FIG. 1 thereof, there is shown, on the top of the housing 1 of a food processor, a receiving aperture 2 in the center of which is located a output shaft 3 driven by a non-illustrated drive motor of the food processor. An annular shoulder 4 surrounds the output shaft 3. A plurality of projections 5, extending over a particular arc length, are provided on the inner circumference of the receiving aperture 2.

A beating jar 6 likewise has a plurality of segment-shaped projections 8 on its base 7 that can be plugged into the receiving aperture 2. When the beating jar 6 is placed on the housing 1, the base 7 of the beating jar 6 is introduced into the receiving aperture 2. The beating jar 6 is then twisted so that its segment-shaped projections 8 pass through between the projections 5 of the receiving aperture 2. The projections 5 and 8 serve to produce a bayonet connection between the housing 1 and the beating jar 6, the beating jar 6 being twisted so that its segment-shaped projections 8 engage under the projections 5 of the receiving aperture 2. As a result, the beating jar 6 is fixed in the receiving aperture 2.

It may now be necessary, for any reason, for the beating jar 6 or another container to be plugged onto the housing 1 only in a particular position. To ensure such a connection, an axially projecting lug serving as a positioning element 9 is provided on the base 7 of the beating jar 6, and a slot extending over an arc length corresponding to the angle of twist of the beating jar 6 when the bayonet connection is formed is cut out from the annular shoulder 4 and serves as a corresponding positioning element 10. The positioning is achieved by permitting the beating jar 6 to be placed on the housing 1 only in such a position that the positioning element 9 and the positioning element 10 are disposed opposite to one another. The longitudinal extent of the slot 10 permits the twisting of the beating jar 6 necessary to produce the bayonet connection.

If there is no bayonet connection, but a container merely needs to be plugged by its base into the receiving aperture 2, such a requirement can be met by an aperture in the annular shoulder 4 corresponding to the cross-sectional shape and size of the lug 9.

Indentations on the container 6, on one hand, and visible signs displayed or embossings formed on the housing 1, on the other hand, may also serve as positioning elements 9 and 10. These visible signs or embossings are, then, opposite one another when the container 6 is placed on the housing 1 in the correct position.

As, when the beating jar 6 is plugged onto the housing 1, the lug 9 and the annular shoulder 4 are no longer visible from a particular point of the insertion of the beating jar 6 into the receiving aperture 2, provision is made for a marking 11 indicating the positioning element 9 to be provided on the beating jar 6 and for a further marking 12, similarly indicating the positioning element 10, to be provided on the housing 1, these markings 11 and 12 being displayed in a position such that they always remain visible during the operation of plugging in the beating jar 6.

If a conspicuous point on the circumference, for example, a handle, exists on the container to be placed on the housing 1, that point on the circumference can serve as a marking element. In such a case, this point on the circumference merely needs to be brought into alignment with the marking provided on the housing 1 to simplify the positionally correct placement of the container 6 on the housing 1.

We claim:

1. A food processor, comprising:
   a housing having a shaft connection point;
   a bayonet connection;
   a container for receiving a tool, said container removably placed at said housing adjacent said shaft connection point and retained on said housing by said bayonet connection;
   an output shaft connected to said housing at said shaft connection point, said output shaft to be coupled to the tool when said container is placed at said housing at a given position;
   a drive unit disposed in said housing and coupled to said output shaft for driving said output shaft; and
   both said container and said housing having at least one positioning element separate from said bayonet connection, said at least one positioning element on said container and said housing being aligned with one another and lying at least approximately opposite one another when said container is placed at said housing in said given position.

2. The food processor according to claim 1, wherein:
   said housing and said container each have visible sides; and
   said positioning elements are disposed on respective ones of said visible sides of said housing and of said container.

3. The food processor according to claim 1, wherein:
   said housing and said container each have sides visible when said container is placed at said housing in said given position; and
   said positioning elements are disposed on respective ones of said visible sides of said housing and of said container.

4. The food processor according to claim 1, wherein:
   said container has a handle; and
   said handle is said at least one positioning element of said container.

5. The food processor according to claim 1, wherein:
   said container has a handle;
   said at least one positioning element is a plurality of positioning elements; and
   said handle is one of said positioning elements of said container.

6. The food processor according to claim 1, wherein said container is one of a mixing jar and a chopping jar.

7. The food processor according to claim 1, wherein:
   said container has an outside and a first marking on said outside;

said housing has an outside and a second marking on said outside; and said first and second markings are visible from outside said container and said housing.

8. The food processor according to claim 1, wherein:

said bayonet connection has a twist angle;

said housing has a first part of said bayonet connection;

said container has a second part of said bayonet connection;

said at least one positioning element are positioning elements including:
 a lug-shaped projection; and
 a corresponding receiving slot extending over an arc length corresponding to said twist angle; and said lug-shaped projection and said receiving slot are respectively disposed at one of said housing and said container.

9. A food processor, comprising:

a housing having a shaft connection point;

a bayonet connection;

a food processing tool;

a container receiving said tool, said container removably placed at said housing adjacent said shaft connection point and retained on said housing by said bayonet connection;

an output shaft connected to said housing at said shaft connection point, said output shaft coupled to said tool when said container is placed at said housing at a given position;

a drive unit disposed in said housing and coupled to said output shaft for driving said output shaft; and both said container and said housing having at least one positioning element separate from said bayonet connection, said at least one positioning element on said container and said housing being aligned with one another and lying at least approximately opposite one another when said container is placed at said housing in said given position.

10. The food processor according to claim 9, wherein:

said housing and said container each have visible sides; and said positioning elements are disposed on respective ones of said visible sides of said housing and of said container.

11. The food processor according to claim 9, wherein:

said housing and said container each have sides visible when said container is placed at said housing in said given position; and said positioning elements are disposed on respective ones of said visible sides of said housing and of said container.

12. The food processor according to claim 9, wherein:

said container has a handle; and said handle is said at least one positioning element of said container.

13. The food processor according to claim 9, wherein:

said container has a handle;

said at least one positioning element is a plurality of positioning elements; and said handle is one of said positioning elements of said container.

14. The food processor according to claim 9, wherein said container is one of a mixing jar and a chopping jar.

15. The food processor according to claim 9, wherein:

said container has an outside and a first marking on said outside;

said housing has an outside and a second marking on said outside; and said first and second markings are visible from outside said container and said housing.

16. The food processor according to claim 9, wherein:

said bayonet connection has a twist angle;

said housing has a first part of said bayonet connection;

said container has a second part of said bayonet connection;

said at least one positioning element are positioning elements including:
 a lug-shaped projection; and
 a corresponding receiving slot extending over an arc length corresponding to said twist angle; and said a lug-shaped projection and said receiving slot are respectively disposed at one of said housing and said container.

17. The food processor according to claim 15, wherein said container is one of a mixing jar, a chopping jar, and a jar for mini-choppers.

18. A food processor, comprising:

a housing having:
 a first part of a bayonet connection; and
 a first part of a plug-in element separate from said first part of said bayonet connection;

a container having:
 a second part of said bayonet connection; and
 a second part of said plug-in element separate from said first part of said bayonet connection;

said container retained on said housing in a given position by said first and second parts of said bayonet connection; and said first and second parts of said plug-in element inserted into one another when said container is placed at said housing in said given position.

19. The food processor according to claim 18, wherein:

said bayonet connection has a twist angle; and a lug-shaped projection and a corresponding receiving slot extending over an arc length corresponding to said twist angle are respectively disposed at one of said housing and said container.

20. A food processor, comprising:

a housing;

a bayonet connection;

a container retained on said housing by said bayonet connection; and said housing and said container having plug-in positioning elements separate from said bayonet connection inserted into one another in a position in which said container is placed at said housing.

21. The food processor according to claim 20, wherein:

said housing has a first part of a bayonet connection having a twist angle;

said container has a second part of said bayonet connection;

said plug-in positioning elements include:
 a lug-shaped projection; and
 a corresponding receiving slot extending over an arc length corresponding to said twist angle; and said a lug-shaped projection and said receiving slot are respectively disposed at one of said housing and said container.

* * * * *